(12) United States Patent
Kim (10) Patent No.: US 9,168,896 B2
(45) Date of Patent: Oct. 27, 2015

(54) VEHICLE DRIVING CONTROL SYSTEM AND METHOD

(71) Applicants: Hyundai Motor Company, Seoul (KR); Kia Motors Corporation, Seoul (KR)

(72) Inventor: Sang Joon Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 15 days.

(21) Appl. No.: 14/081,172

(22) Filed: Nov. 15, 2013

(65) Prior Publication Data

US 2014/0163776 A1    Jun. 12, 2014

(30) Foreign Application Priority Data

Dec. 12, 2012  (KR) .......................... 10-2012-0144844

(51) Int. Cl.
*B60R 99/00*    (2009.01)
*B60R 16/023*   (2006.01)

(52) U.S. Cl.
CPC ............. *B60R 99/00* (2013.01); *B60R 16/0236* (2013.01)

(58) Field of Classification Search
CPC ............................ B60R 16/0236; B60R 99/00
See application file for complete search history.

(56) References Cited

U.S. PATENT DOCUMENTS

| 2006/0015234 A1* | 1/2006 | Luh | 701/51 |
| 2009/0143948 A1* | 6/2009 | Dahl et al. | 701/56 |

FOREIGN PATENT DOCUMENTS

| JP | 2005526217 A | 9/2005 |
| JP | 2008-220004 A | 9/2008 |
| JP | 2009248648 A | 10/2009 |
| JP | 2009280170 A | 12/2009 |
| KR | 10-1010124 B1 | 1/2011 |
| KR | 2011-0055286 A | 5/2011 |
| KR | 10-2012-0025229 | 3/2012 |
| KR | 10-1166351 | 7/2012 |

OTHER PUBLICATIONS

Machine translation of Nakagawa JP 2008-220004 (provided by Applicant in IDS).*

* cited by examiner

*Primary Examiner* — John Q Nguyen
*Assistant Examiner* — Michael Kerrigan
(74) *Attorney, Agent, or Firm* — Mintz Levin Cohn Ferris Glovsky and Popeo, P.C.; Peter F. Corless (57) ABSTRACT

A vehicle driving control system and method for selecting a driving pattern using a predetermined program (or application) and for operating vehicle driving via a terminal that provides driving information of the selected driving pattern. The vehicle driving control system may include a terminal configured to transmit a selected driving pattern mode and driving pattern control information on the selected driving pattern mode to a vehicle controller when a predetermined vehicle driving pattern control program is executed. A vehicle controller is configured to operate an object of a vehicle related to driving based on the driving pattern mode and the driving pattern control information transmitted by the terminal. A transceiver is configured to transmit and receive signals between the terminal and the vehicle controller.

14 Claims, 8 Drawing Sheets

VEHICLE DRIVING CONTROL SYSTEM AND METHOD

CROSS-REFERENCE TO RELATED APPLICATION

This application claims priority to and the benefit of Korean Patent Application No. 10-2012-0144844 filed in the Korean Intellectual Property Office on Dec. 12, 2012, the entire contents of which are incorporated herein by reference.

BACKGROUND (a) Field of the Invention

The present invention relates to a vehicle driving control system and method for selecting a driving pattern by a predetermined program (or application) and controlling vehicle driving in line with a terminal that provides information on driving control based on the selected driving pattern.

(b) Description of the Related Art

Recently, information technology devices are being actively applied to vehicles with the rapid development of information technology. For example, a method of controlling an audio and video navigation (AVN) and an electronic control unit (ECU) of a vehicle using a portable terminal have been developed.

Furthermore, due to popularization of smart phones, various technologies of connecting smart phones to vehicles are being developed to be applied to vehicles. For example, a function of starting a vehicle or opening a door of a vehicle using a smart phone has been developed for a vehicle. On the other hand, various driving pattern modes such as an eco mode and a sports mode are being applied to a recently manufactured vehicle to improve drivability, economic feasibility, and convenience.

The eco mode is a driving pattern mode in which fuel consumption is improved and the sports mode is a driving pattern mode in which a driver may drive a vehicle that has an automatic transmission like a vehicle with a manual transmission to improve acceleration performance.

According to an exemplary embodiment of a related art, a selection switch for selecting a driving pattern mode such as the eco mode and the sports mode is installed in a vehicle. A driver may manipulate the selection switch to drive a vehicle in a desired driving pattern mode.

The method of determining the desired driving pattern mode via the driving pattern mode selection switch is inconvenient since a selection switch of a corresponding mode may be installed within a vehicle. However, in the method of determining the desired driving pattern mode via the driving pattern mode selection switch, performing an update when an additional mode is generated or when the driving pattern mode is to be corrected may be difficult.

The above information disclosed in this section is only for enhancement of understanding of the background of the invention and therefore it may contain information that does not form the prior art that is already known in this country to a person of ordinary skill in the art.

SUMMARY

Therefore, the present invention provides a vehicle driving control system in which an application set to provide various driving pattern menus and driving control information on the driving patterns may be installed in a terminal (e.g., a smart phone/mobile device and a navigation) that is adaptable and update performance and vehicle driving may be controlled via the terminal.

According to an exemplary embodiment of the present invention, a vehicle driving control system may include a terminal configured to transmit a selected driving pattern mode selected and driving pattern control information on the selected driving pattern mode to a vehicle controller when a predetermined vehicle driving pattern control program is executed, a vehicle controller that operates an object of a vehicle related to driving based on the driving pattern mode and the driving pattern control information transmitted by the terminal, and a transceiver configured to transmit and receive signals between the terminal and the vehicle controller.

The driving pattern mode may include an eco mode and a sports mode. The driving pattern control information may include a transmission pattern suitable for the selected driving pattern mode, request torque map information, and global positioning system (GPS) information. The vehicle may be an electric vehicle. The driving pattern control information may include a transmission pattern suitable for the selected driving pattern mode, request torque map information, GPS information, and coasting torque map information.

Further, the terminal may provide a menu from which a user may select a driving pattern mode such as a downtown driving mode, a highway driving mode, a national highway driving mode, a mountain driving mode, and an active variable driving mode as a sub-menu of the eco mode. The terminal may provide a menu from which a user may select a driving pattern mode such as a Min mode, a Medium mode, and a Max mode as a sub-menu of the sports mode.

The transceiver may include a gateway. The transceiver and the terminal may communicate with each other using one of Bluetooth, zigbee and near field communication (NFC). The terminal may include a smart phone, a navigation, a laptop, a mobile device, and a personal data assistant (PDA).

As described above, according to an exemplary embodiment of the present invention, an application set to provide various driving pattern menus and driving control information on the driving patterns may be installed on a terminal (e.g., a smart phone and a navigation) that is adaptable and update performance and vehicle driving may be controlled via the terminal to improve convenience of a vehicle.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, fuel cell vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present invention will be described more fully hereinafter with reference to the accompanying drawings, in which exemplary embodiments of the invention are shown. However, the present invention is not limited to the exemplary embodiments described hereinafter but may be specified in other forms.

In addition, in the entire specification, when it is referred that a part includes a certain constituent element, unless described to the contrary, it does not mean that other constituent elements are excluded but means that the constituent element may be further included.

Figure 1:
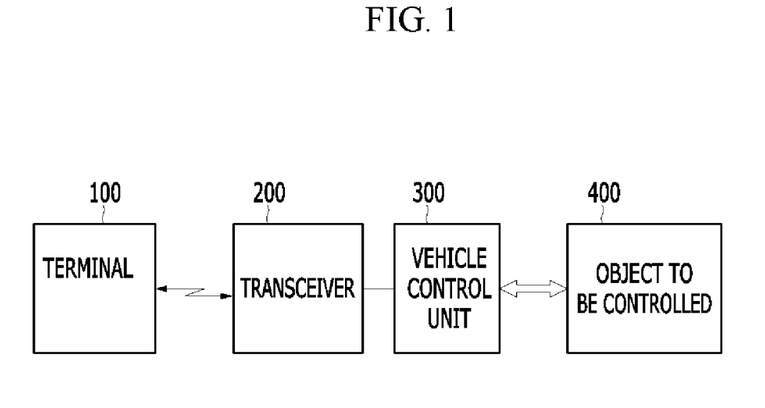
FIG. 1 is an exemplary block diagram of a vehicle driving control system according to an exemplary embodiment of the present invention.

FIG. 1 is an exemplary block diagram illustrating a vehicle driving control system according to an exemplary embodiment of the present invention. A vehicle driving control system according to an exemplary embodiment of the present invention may be configured to select a driving pattern using a predetermined program (or application) and operate vehicle driving via a terminal that provides information on driving control based on the selected driving pattern.

A driving control system according to the exemplary embodiment of the present invention may include a terminal 100 configured to transmit a selected driving pattern mode and driving pattern control information on the selected driving pattern mode to a vehicle controller when a predetermined vehicle driving pattern control program (or application) is executed, wherein the vehicle controller 300 is configured to operate an object (e.g., an engine and a transmission) of a vehicle related to driving based on the driving pattern mode and the driving pattern control information transmitted by the terminal 100, and a transceiver 200 configured to transmit and receive signals between the terminal 100 and the vehicle controller 300.

The terminal 100 may be, for example, a smart phone, a mobile device, a navigation, a laptop, or a personal data assistant (PDA) according to an exemplary embodiment of the present invention. However, it should be understood that the scope of the present invention is not limited thereto. The present invention may be applied to any terminal capable of selecting a driving pattern mode and providing control information on the selected driving pattern mode.

The terminal 100 may be configured to download the driving pattern control program via an application (app). The terminal 100 may be configured to perform a Bluetooth communication, a zigbee communication, or near field communication (NFC) with the transceiver 200. In addition, the transceiver 200 may include a gateway configured to transmit and receive data between the terminal 100 and the vehicle controller 300. The transceiver 200 includes a Bluetooth communication, a zigbee communication, or NFC communication modules that communicate with the terminal 100. The transceiver 200 may be independently formed or may be integrated in the vehicle controller 300.

The vehicle controller 300 may be configured to operate the object 400 based on the driving pattern mode and the driving pattern control information input via the transceiver 200. The object 400 may include an engine, a transmission, and a drive motor (in a hybrid vehicle) related to vehicle driving.

Figure 2:
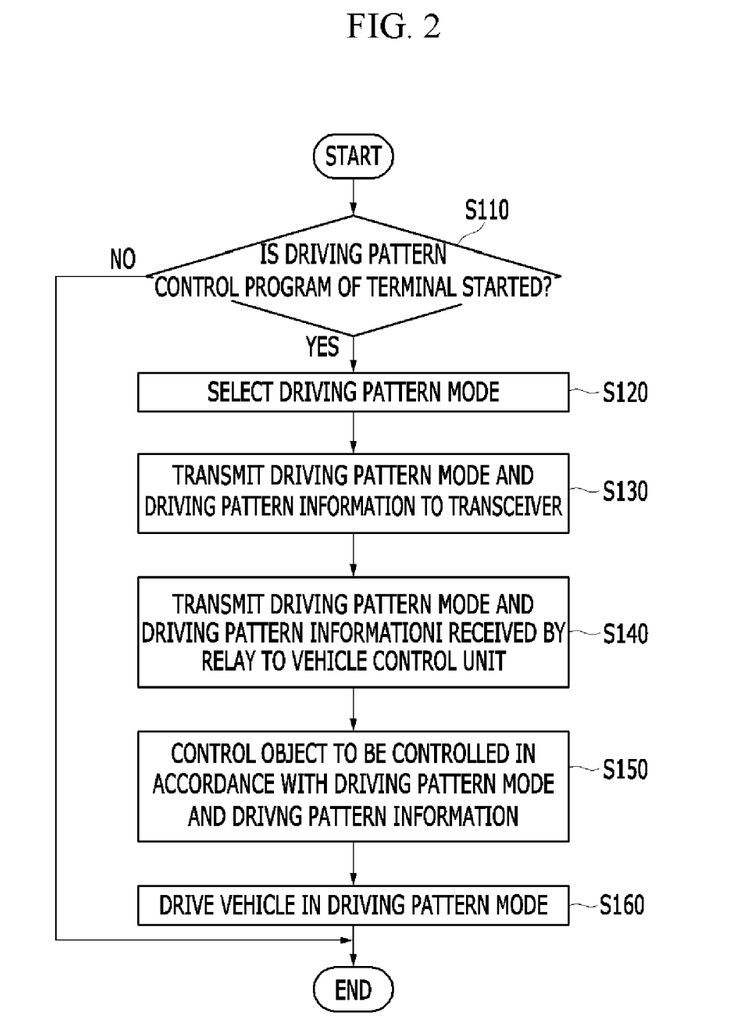
FIG. 2 is an exemplary flowchart illustrating an operation of a vehicle driving control system according to an exemplary embodiment of the present invention.

Hereinafter, an operation of a vehicle driving control system according to an exemplary embodiment of the present invention will be described in detail with reference to the accompanying drawings. FIG. 2 is an exemplary flowchart illustrating an operation of a vehicle driving control system according to an exemplary embodiment of the present invention.

A user starts a driving pattern control program installed in the terminal 100 to use the vehicle driving control system according to an exemplary embodiment of the present invention S110. When the driving pattern control program is started, a menu capable for selecting a driving pattern mode may be displayed on a screen of the terminal 100.

Figure 3:
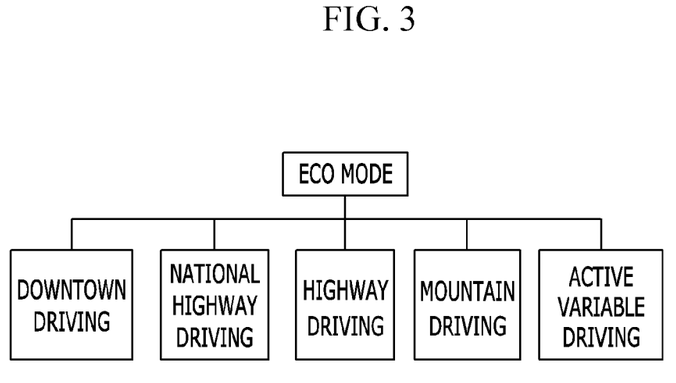
FIG. 3 is an exemplary block diagram illustrating detailed driving modes of an eco mode according to an exemplary embodiment of the present invention.

The driving pattern mode may include an eco mode and a sports mode. The eco mode is a fuel reducing mode and the sports mode is an acceleration performance increasing mode. In the eco mode, as shown in FIG. 3, a sub-menu from which driving modes may be selected, may include a downtown driving, a national highway driving, a highway driving, and a mountain driving. In the sports mode, a sub-menu from which a mode be selected, may include a Min mode, a Medium mode, and a Max mode based on a degree of increase in acceleration performance.

When a desired driving pattern mode is selected via the terminal 100 S120, the selected driving pattern mode and driving pattern control information on the selected driving pattern mode may be transmitted to the transceiver 200 via wireless communication S130.

The driving pattern control information may include a transmission pattern suitable for a corresponding driving pattern mode, acceleration request torque map information, GPS information, and coasting torque map information. Information used in a previous vehicle may be used as the above driving pattern control information.

When the transceiver 200 receives the driving pattern mode and the driving pattern control information from the terminal 100, the transceiver 200 may be configured to transmit the received driving pattern mode and driving pattern control information to the vehicle controller 300 S140. The transceiver 200 may be configured to transmit a signal and information to the vehicle controller 300 via a wire connection.

When the vehicle controller 300 receives the driving pattern mode and the driving pattern control information from the transceiver 200, the vehicle controller 300 may be configured to operate the object to be controlled (e.g., a transmission, an engine, and a drive motor) based on the driving pattern mode and the driving pattern control information to drive a vehicle in a corresponding driving pattern mode S150 and S160. For example, when the eco mode and the downtown driving mode are selected via the terminal 100, the vehicle controller 300 may be configured to drive (e.g., operate) the vehicle in the downtown driving mode in the eco mode based on information on a transmission pattern (or a transmission map) and a request torque map received through the transceiver 200. The downtown driving mode may be selected, for example, in a terrain where stop-go driving is repeatedly performed at a maximum speed of about 60 km/h.

A transmission map in the downtown driving mode may be set to perform a more rapid upshift than in a common driving mode. A request torque map in the downtown driving mode may be set to perform a rapid response to a signal of an accelerator pedal sensor (APS) at a speed of about 0 to 60 km/h and a response to the signal of the APS may be delayed at a speed of no less than about 60 km/h to prevent acceleration from being unnecessarily performed.

When the vehicle is a hybrid vehicle, the coasting torque map of the downtown driving mode may be set to increase a regenerative braking torque during coasting. For example, when the eco mode and the highway driving mode are selected via the terminal 100, the vehicle controller 300 may be configured to drive (e.g., operate) the vehicle in the highway driving mode of the eco mode based on the information on the transmission pattern and request torque map received through the transceiver 200.

The highway driving mode may be selected, for example, in a range where constant speed driving is performed at a maximum speed of about 100 to 110 km/h. The transmission map in the highway driving mode may be set as the same transmission map as that of the downtown driving mode. A request torque map in the highway driving mode may be set to perform a rapid response to a signal of the APS at a speed of about 0 to 110 km/h and a response to the signal of the APS may be delayed at a speed of no less than about 110 km/h to prevent acceleration from being unnecessarily performed.

When the vehicle is a hybrid vehicle, the coasting torque map of the downtown driving mode may be set to have a smaller amount of regeneration than that of the downtown driving mode. For example, when the eco mode and the national highway driving mode are selected via the terminal 100, the vehicle controller 300 may be configured to drive (e.g., operate) the vehicle in the national highway driving mode in the eco mode based on the information on the transmission pattern and request torque map received through the transceiver 200.

The national highway driving mode may be selected, for example, in a range where constant speed driving is performed at a maximum speed of about 80 km/h. A transmission map in the national highway driving mode may be set as the same transmission map as that of the downtown driving mode. The request torque map in the national highway driving mode may be set to perform a rapid response to a signal of the APS at a speed of about 0 to 80 km/h and a response to the signal of the APS may be delayed at a speed of no less than about 80 km/h to prevent acceleration from being unnecessarily performed.

When the vehicle is a hybrid vehicle, the coasting torque map of the national highway driving mode may be set to have an amount of regeneration smaller than that of the highway driving mode and larger than that of the downtown driving mode. For example, when the eco mode and the mountain driving mode are selected via the terminal 100, the vehicle controller 300 may be configured to drive (e.g., operate) the vehicle in the mountain driving mode of the eco mode based on the information on the transmission pattern and request torque map received through the transceiver 200.

The mountain driving mode may be selected, for example, in a range where driving is performed at a lower speed than in the downtown driving mode. A transmission map in the mountain driving mode may be set as the same transmission map as that of the downtown driving mode. A request torque map in the mountain driving mode may be set to perform a rapid response to a signal of the APS at a speed of about 0 to 50 km/h and a response to the signal of the APS may be delayed at a speed of no less than about 50 km/h to prevent acceleration from being unnecessarily performed.

When the vehicle is a hybrid vehicle, the coasting torque map of the mountain driving mode may be set to have an amount of regeneration larger than that of the downtown driving mode to increase a coasting torque in a downhill and to increase an amount of energy regeneration. For example, when the eco mode and an active variable driving mode are selected via the terminal 100, the vehicle controller 300 may be configured to determine a current road state based on GPS information to select a driving mode suitable for the current road state from the downtown, national highway, highway, and mountain driving modes and to actively drive (e.g., operate) the vehicle.

Figure 4:
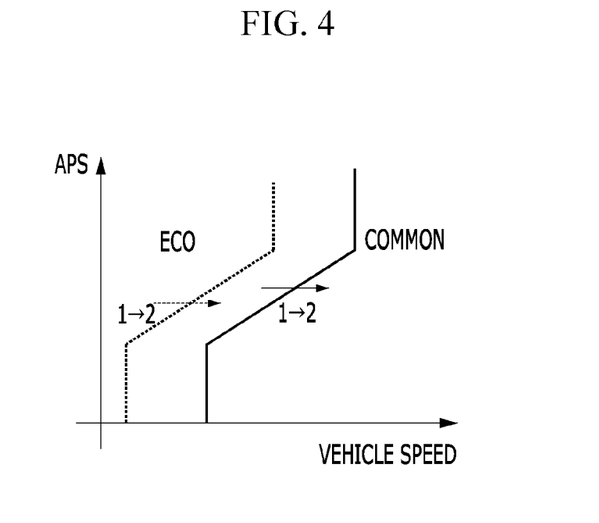
FIGS. 4 to 6 are exemplary graphs illustrating an eco mode according to an exemplary embodiment of the present invention.
Figure 5:
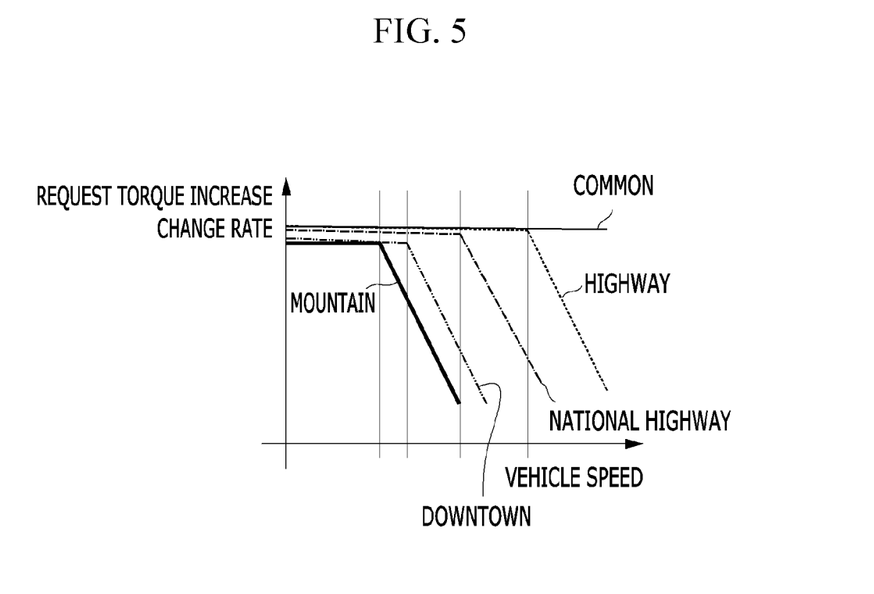
Figure 6:
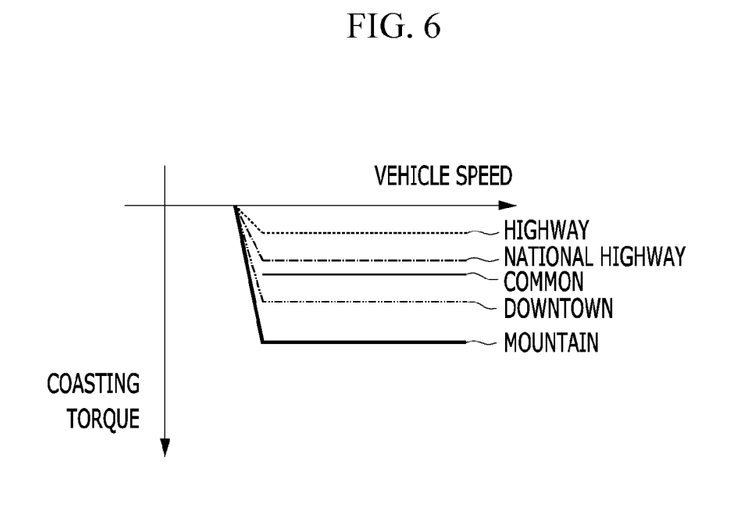

FIGS. 4 to 6 are exemplary graphs illustrating a driving state of a vehicle in the eco mode. In FIG. 4, 1→2 represents a transmission performed from a first to a second vehicle speed.

Figure 7:
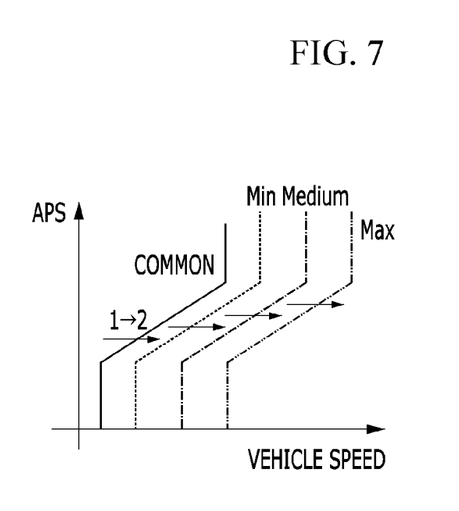
FIGS. 7 and 8 are exemplary graphs illustrating a sports mode according to an exemplary embodiment of the present invention.
Figure 8:
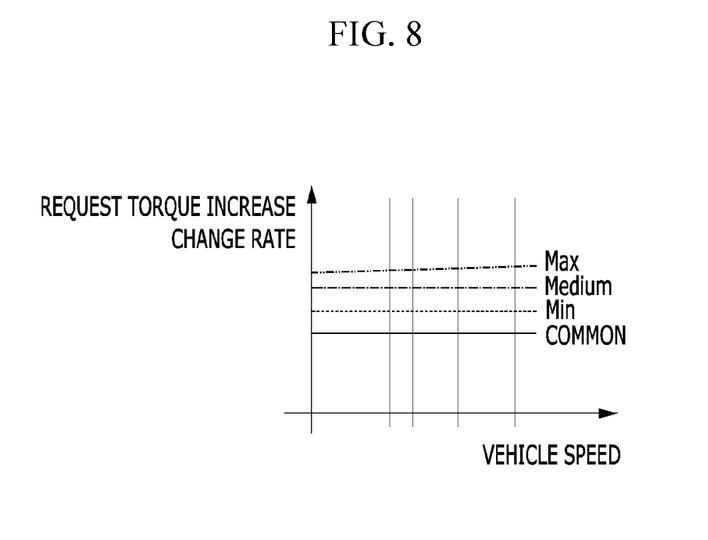

On the other hand, for example, when the sports mode and the Min mode are selected via the terminal 100, the vehicle controller 300 may be configured to drive (e.g., operate) the vehicle in the Min mode of the sports mode of the vehicle based on the information on the transmission pattern and the request torque map received through the transceiver 200. The Min mode of the sports mode may be selected by a driver who dislikes a common driving mode. In the Min mode, a lowest acceleration performance is required in the sports mode. In the Min mode of the sports mode, as shown in FIG. 7, an upshift point in time is slower than in the common driving mode. In the Min mode of the sports mode, as shown in FIG. 8, a request torque change rate is higher than in the common driving mode. For example, when the sports mode and the Medium mode are selected via the terminal 100, the vehicle controller 300 may be configured to drive (e.g., operate) the vehicle in the Medium mode of the sports mode of the vehicle based on the information on the transmission pattern and request torque map received through the transceiver 200.

In the Medium mode of the sports mode, acceleration performance is higher than in the Min mode. In the Medium mode of the sports mode, as shown in FIG. 7, an upshift point in time is slower than in the Min mode. In the Medium mode of the sports mode, the request torque change rate is higher than in the Min mode. For example, when the sports mode and the Max mode are selected via the terminal 100, the vehicle controller 300 may be configured to drive (e.g., operate) the vehicle in the Max mode of the sports mode of the vehicle based on the information on the transmission pattern and request torque map received through the transceiver 200.

The Max mode of the sports mode may be set to achieve a maximum acceleration performance. In the Max mode of the sports mode, as shown in FIG. 7, an upshift point in time is reduced to a threshold level. In the Max mode of the sports mode, as shown in FIG. 8, the request torque change rate is increased to the threshold level to improve responsiveness. Therefore, according to the exemplary embodiment of the present invention, an application set to provide various driving pattern menus and driving control information on the driving patterns may be installed in a terminal (e.g., a smart phone and a navigation) that is adaptable and update performance and vehicle driving may be controlled in line with the terminal.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

Description of Symbols

| | |
|---|---|
| 100: terminal | 200: transceiver |
| 300: vehicle controller | 400: object to be controlled |

What is claimed is:

1. A vehicle driving control system, comprising:
    a terminal configured to transmit a selected driving pattern mode and driving pattern control information of the selected driving pattern mode to a vehicle controller when a predetermined vehicle driving pattern control program is executed, wherein the vehicle controller is configured to:
        to operate an object of a vehicle related to driving based on the driving pattern mode and the driving pattern control information transmitted by the terminal; and
    a transceiver configured to transmit and receive signals between the terminal and the vehicle controller,
    wherein the driving pattern mode includes an eco-mode and a sports mode, and
    wherein the terminal is further configured to provide a menu set from one or more modes are selected, wherein the mode include: a Min mode, a Medium mode, and a Max mode each corresponding to a different acceleration performance, as a sub-menu of the sports mode.

2. The vehicle driving control system of claim 1, wherein the driving pattern control information includes a transmission pattern suitable for the selected driving pattern mode, request torque map information, and global positioning system (GPS) information.

3. The vehicle driving control system of claim 1, wherein the vehicle is an electric vehicle.

4. The vehicle driving control system of claim 3, wherein the driving pattern control information includes: a transmission pattern suitable for the selected driving pattern mode, request torque map information, global positioning system (GPS) information, and coasting torque map information.

5. The vehicle driving control system of claim 1, wherein the terminal is further configured to:
    provide a menu set from which one or more driving modes are selected, wherein the driving modes include: a downtown driving mode, a highway driving mode, a national highway driving mode, a mountain driving mode, and an active variable driving mode as a sub-menu of the eco mode.

6. The vehicle driving control system of claim 1, wherein the transceiver includes a gateway.

7. The vehicle driving control system of claim 1, wherein the transceiver and the terminal communicate via a Bluetooth communication, a Zigbee communication, or and a near field communication (NFC).

8. A method of controlling vehicle driving, comprising:
    transmitting, by a terminal, a selected driving pattern mode and driving pattern control information of the selected driving pattern mode to a vehicle controller
    operating, by a controller, an object of a vehicle related to driving based on the driving pattern mode and the driving pattern control information transmitted by the terminal;
    transmitting and receiving, by a transceiver, signals between the terminal and the controller;
    wherein the driving pattern mode includes an eco-mode and a sports mode, and
    providing, by the terminal, a menu set from which one or more modes are selected, wherein the modes include: a Min mode, a Medium mode, and a Max mode, each corresponding to a different acceleration performance, as a sub-menu of the sports mode.

9. The method of claim 8, wherein the driving pattern control information includes a transmission pattern suitable for the selected driving pattern mode, request torque map information, and global positioning system (GPS) information.

10. The method of claim 8, wherein the vehicle is an electric vehicle.

11. The method of claim 10, wherein the driving pattern control information includes: a transmission pattern suitable for the selected driving pattern mode, request torque map information, global positioning system (GPS) information, and coasting torque map information.

12. The method of claim 8, further comprising:
    providing, by the terminal, a menu set from which one or more driving modes are selected, wherein the driving modes include: a downtown driving mode, a highway driving mode, a national highway driving mode, a mountain driving mode, and an active variable driving mode as a sub-menu of the eco mode.

13. The method of claim 8, wherein the transceiver includes a gateway.

14. The method of claim 8, wherein the transceiver and the terminal communicate via a Bluetooth communication, a Zigbee communication, or and a near field communication (NFC).

* * * * *